(12) United States Patent
Broszniowski

(10) Patent No.: US 6,775,877 B1
(45) Date of Patent: Aug. 17, 2004

(54) MOTOR VEHICLE WIPER COMPRISING A WEAR INDICATOR

(75) Inventor: Francois Broszniowski, Magny les Mameaux (FR)

(73) Assignee: Valeo Systemes d'Essuyage (FR)

( * ) Notice: Subject to any disclaimer, the term of this patent is extended or adjusted under 35 U.S.C. 154(b) by 0 days.

(21) Appl. No.: 09/868,224

(22) PCT Filed: Dec. 10, 1999

(86) PCT No.: PCT/FR99/03106

§ 371 (c)(1),
(2), (4) Date: Sep. 17, 2001

(87) PCT Pub. No.: WO00/35726

PCT Pub. Date: Jun. 22, 2000

(30) Foreign Application Priority Data

Dec. 15, 1998 (FR) .............................. 98 15816

(51) Int. Cl.$^7$ ................................. B60S 1/38
(52) U.S. Cl. ............... 15/250.001; 15/250.48; 15/250.361; 436/2; 422/50; 422/55; 422/57; 116/200; 116/206
(58) Field of Search ....................... 15/250.001, 250.48, 15/250.361, 250.43, 250.44, 250.351; 436/2, 7; 422/56, 57, 55, 50, 58; 116/200, 206, 216, 207

(56) References Cited

U.S. PATENT DOCUMENTS

| | | | | |
|---|---|---|---|---|
| 4,212,153 A | * | 7/1980 | Kydonieus et al. | ............ 368/62 |
| 5,053,339 A | * | 10/1991 | Patel | .............................. 436/2 |
| 5,057,434 A | * | 10/1991 | Prusik et al. | ................... 436/2 |
| 5,349,718 A | * | 9/1994 | Gibbon | ..................... 15/250.48 |
| 6,047,436 A | * | 4/2000 | Rohrbach et al. | ....... 15/250.361 |
| 6,514,462 B1 | * | 2/2003 | Simons | .................... 422/82.12 |

FOREIGN PATENT DOCUMENTS

| | | | |
|---|---|---|---|
| DE | 3639831 | * | 5/1988 |
| DE | 43 11 846 | | 9/1994 |
| EP | 0231499 | * | 8/1987 |
| EP | 0 635 510 | | 1/1995 |
| FR | 2 753 943 | | 4/1998 |
| WO | 95/01896 | * | 1/1995 |

\* cited by examiner

Primary Examiner—Gary K. Graham
(74) Attorney, Agent, or Firm—J. Gordon Lewis

(57) ABSTRACT

A motor vehicle wiper includes a wiper blade mounted on the free end of a wiper arm and pressing a wiping stem against the glass to be wiped. The wiper is provided with a wear indicator using a substance based at least on an azo compound.

20 Claims, 1 Drawing Sheet

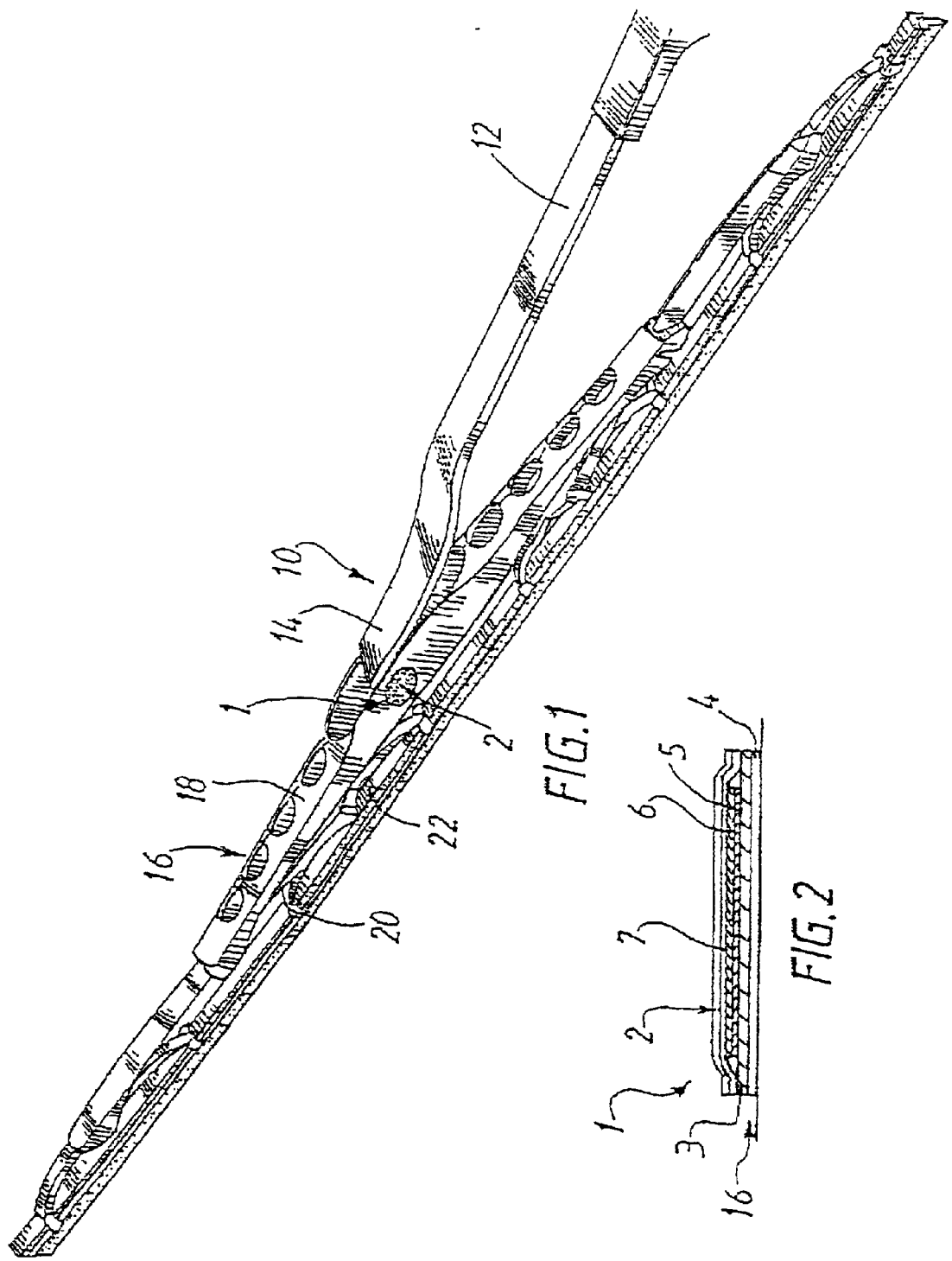

MOTOR VEHICLE WIPER COMPRISING A WEAR INDICATOR

BACKGROUND

This invention concerns the wiping means of the windows of motor vehicles and, more specifically, their wear.

A wiper blade equipped with its elastic wiper stem is a piece of the vehicle that wears out and which must be replaced regularly if one wants to guarantee a good wiping quality of the window. This proves to be even more important for the driving safety while one is using the wiper blade on the front windshield of the vehicle.

The sources of wear are numerous and the blade is susceptible to degrading as much at the level of the wiper stem as at the joints and the articulation mount that carries it.

For example, the wiper stem is susceptible to wear via friction but can also wear due to the deterioration of the material that it is made of.

The agents of such deterioration are principally:
- sun light, and more specifically, ultraviolet rays that light contains;
- oxygen because, even if the vehicle is normally parked in a closed garage, and thus sheltered from sunlight, it cannot be sheltered from oxidation;
- temperature, variations of temperature, and humidity;
- ozone and all electromagnetic radiation from the environment.

Thus, it appears to be pertinent to determine the lifespan of the wiper blade as a function of its time exposed to the air.

In addition, frequently drivers are incapable of remembering when they last changed their wiper blades. In effect, such an operation is not generally entrusted to a vehicle repair specialist who can, for example, proceed to a systematic, regular replacement of the blades.

It is known, for example, from application WO/01896, to use wear indicators that change color as a result of exposure to the environment. This type of indicator presents the major inconvenience of only being sensitive to one parameter of wear, for example ultraviolet rays.

The goal of this invention is to allow the driver to determine the state of reliable wear of the wiper blades of his vehicle via a wear indicator that is representative of real wear constraints, and not dependent on sun exposure, that is to say the geographic or meteorological situation, or environment, for example pollution or altitude.

In order to achieve this goal, the invention proposes taking into account, in the composition of the wear indicator, the principal agents or parameters of the wear of the wiper stem of the wiper blades and their combined action in use conditions.

More precisely, the goal of the invention is a motor vehicle wiper comprising a wiper blade that is mounted on the free end of a wiper stem and pressing a wiper stem against a window to be wiper, in which the wiper is provided with an indicator comprising a substance based at least on an azo compound.

It has been remarked that the sensitivity of the azo compounds to chemical (oxygen, ozone) and physical conditions (radiation, temperature, humidity) as well as to mechanical constraints is comparable to that of the elastamers making up the wiping stem.

According to other characteristics of the invention;
- the wear indicator is a multi-layered label comprising an adhesive layer and a plastic support film from at least one inert layer of a reference color and a reactive degradable layer, made up of a substance of a different color based on the azo compound;
- the inert and reactive layers are formed via ink in which an inert chemical pigmentation, defining a reference color, and a base organic pigmentation from the azo by-products are respectively created;
- the inks are successively placed on the plastic support via silk-screening;
- the plastic support is in polyvinyl, polypropylene, or polyester and is covered with a protective layer fixed to the support film, in a detachable manner, via a semi-porous adhesive, this layer being pulled back during the mounting of the blade on the vehicle.
- the wear indicator is carried by the wiper blade.

Other characteristics and advantages of the invention will become clearer in the reading of the detailed description that follows of one example of production, in reference to the attached drawings that represent, respectively:

FIG. 1, front view of a example of an wear indicator of a wiper according to the invention;

FIG. 2, cut view according to the plane II—II of the wear indicator according to FIG. 1.

One has represented on FIGS. 1 a motor vehicle wiper 10 that essentially comprises a wiper arm 12 at the free end 14 of which is mounted in articulation a wiper blade 16.

The wiper blade 16 comprises an articulated structure 18 which carries, via claws 20, a wiping stem 22 generally created in a supple elastomer material. The articulated structure 18 is designed to press, with its entire length, the wiping stem 22 against a window to be wiped on the car, Conforming to the specifications of the invention, the wiper blade 16 carries an wear indicator 1 incorporating organic ink pigmented based on an azo by-product, sensitive and degradable as a result of the chemical attacks and the mechanical constraints to which it is subjected.

The wear indicator 1 can also be attached to places other than the wiper, as long as it is easily visible while the wiper blade 16 is mounted on the vehicle.

One uses as azo by-product an alkaline-terrine salt azo with a sulfuric function. In other examples of production, the compounds used can be double-azos, tetra-double-azos, or sulfuric function azos, taken individually or in combination. Preferably, the compound used furnishes a black color in such a way as to clearly distinguish the deep vibrant color that appears while the ink pigmented via the azo by-product is decomposed.

In the production example, the wear indicator is created in the form of a sticker label covered with a protective film 2 in polyethylene, resistant specifically to ultraviolet radiation and the oxygen in the air. This film adheres to the rest of the label via an adhesive semi-porous layer, in order to be easily detached during installation of the blade 16.

It appears more precisely on FIG. 2, which illustrates the label 1 in cut view, which figure makes up, in addition to the film 2, a support film 3 in polyvinyl, the lower face of which is coated with an adhesive 4 with a strong adhesion capability which allows the assurance of definitive, reliable fixation of the wear indicator 1 on the blade 16. Other plastic materials can be used for the support film, for example from polyester or polypropylene.

On the support film 3 is places a first layer of ink 5, colored yellow with chemically inert pigments, and covered with a second layer of ink 6 of which the color is obtained via incorporation of organic pigments of azo by-products. At the fabrication of the wear indicator 1, the ink layers 5 and 6 are successively placed via a silk-screening technique.

The label is covered by a mask in the shape of a protective film 2, fixed to the support film 3 via a semi-porous adhesive 7. The mask is pulled back during the mounting of the blade on the vehicle while removing it from the support.

Over the course of time, chemical, physical, and mechanical attacks destroy the azo pigments of the upper layer 6. Once totally decomposed, it then displays the yellow lower layer, which hasn't been subjected to any attacks and which indicates an advanced state of wear of the wiping stem.

One has the advantage to choose an intense coloration for the lower layer 5 while it is under the form of a lower degree of oxidation. Thus, noticing the changing color of the wear indicator will be clearer.

The invention is not limited to the example of production described and represented. For example, in order to better control the kinetic of the degradation reaction, one can superimpose on the reactive layer a diffused layer that slows the contact between this layer and the chemical attacks. In addition, it is possible to mix the organic pigments to the mineral oxides, notably to some titanium oxide, in order to improve the sensitivity of the indicator.

What is claimed is:

1. A motor vehicle wiper including a wiper blade mounted at the free end of a wiper arm in order to press a wiping stem against a window to be wiped, characterized by the wiper being provided with an wear indicator comprising a substance based at least on an azo compound covered with a protective mask, wherein the wear indicator is activated with the at least partial removal of the protective mask from the substance.

2. The wiper according to claim 1, characterized by the wear indicator having multi-layers comprising an adhesive layer and a plastic support film of at least one inert layer made of a substance of a reference color and a reactive degradable layer made from a substance of a different color based on azo compounds.

3. The wiper according to claim 2, characterized by the inert and reactive layers being formed respectively by an ink in which a chemically inert pigmentation, defining the reference color, and an organic pigment based on azo by-products are produced.

4. The wiper according to claim 3, characterized by the organic pigments being mixed with mineral oxides.

5. The wiper according to claim 3, characterized by the inks being successively placed on the plastic support via silk screening.

6. The wiper according to claim 2, characterized by the plastic support film being of one of polyvinyl, polypropylene and polyester and being covered by a the protective mask fixed to the support film in a detachable manner, via a semi-porous adhesive, the mask being pulled back during the mounting of the blade on the wiper.

7. The wiper according to claim 1, characterized by the wear indicator being carried by the wiper blade.

8. A motor vehicle wiper blade comprising:

a wear indicator on the wiper including a substance based at least on an azo compound covered with a protective mask, wherein the wear indicator is activated with at least partial removal of the protective mask from the substance.

9. The wiper blade of claim 8 further comprising:

the wear indicator having multi-layers including an adhesive layer and a plastic support film of at least one inert layer made of a substance of a reference color and a reactive degradable layer made from a substance of a different color based on azo compounds.

10. The wiper blade of claim 9 further comprising:

the inert and reactive layers being formed respectively by an ink in which a chemically inert pigmentation, defining the reference color, and an organic pigment based on azo by-products are produced.

11. The wiper blade of claim 10 further comprising:

the organic pigments being mixed with mineral oxides.

12. The wiper blade of claim 10 further comprising:

the inks being successively placed on the plastic support via silk screening.

13. The wiper blade of claim 9 further comprising:

the plastic support film being of one of polyvinyl, polypropylene and polyester and being covered by the protective mask fixed to the support film in a detachable manner, via a semi-porous adhesive, the mask being pulled back during the mounting of the blade on the wiper.

14. A motor vehicle wiper comprising:

a wiper blade mountable at a free end of a wiper arm in order to press a wiping stem against a window to be wiped; and a wear indicator carried on the wiper blade including a substance based at least on an azo compound covered with a protective mask, wherein the wear indicator is activated with the at least partial removal of the protective mask from the substance, the wear indicator having multi-layers including an adhesive layer and a plastic support film of at least one inert layer made of a substance of a reference color and a reactive degradable layer made from a substance of a different color based on azo compounds, the inert and reactive layers being formed respectively by an ink in which a chemically inert pigmentation, defining the reference color, and an organic pigment based on azo by-products are produced, the organic pigments being mixed with mineral oxides, the inks being successively placed on the plastic support via silk screening, the plastic support film being of one of polyvinyl, polypropylene and polyester and being covered by the protective mask fixed to the support film in a detachable manner, via a semi-porous adhesive, the mask being pulled back during the mounting of the blade on the wiper.

15. A wiper blade of a motor vehicle comprising:

a wiper stem made of elastomers; and a wear indicator, wherein the wear indicator includes a substance based at least on an azo compound, the substance based on the azo compound having a sensitivity to chemical and physical conditions and having mechanical constraints comparable to that of the elastomers making up the wiper stem.

16. The wiper blade of claim 15 further comprising:

the wear indicator having multi-layers including an adhesive layer and a plastic support film of at least one inert layer made of a substance of a reference color and a reactive degradable layer made from a substance of a different color based on azo compounds.

17. The wiper blade of claim 16 further comprising:

the inert and reactive layers being formed respectively by an ink in which a chemically inert pigmentation, defining the reference color, and an organic pigment based on azo by-products are produced.

18. The wiper blade of claim 17 further comprising:

the organic pigments being mixed with mineral oxides.

19. The wiper blade of claim 16 further comprising:

the inks being successively placed on the plastic support via silk screening.

20. The wiper blade of claim 16 further comprising:

the plastic support film being of one of polyvinyl, polypropylene and polyester and being covered by the protective mask fixed to the support film in a detachable manner, via a semi-porous adhesive, the mask being pulled back during the mounting of the blade on the wiper.

* * * * *